July 31, 1923.
J. D. BRIDGERS
1,463,496
REATOMIZER ATTACHMENT FOR INTERNAL COMBUSTION ENGINES
Filed Feb. 13, 1922
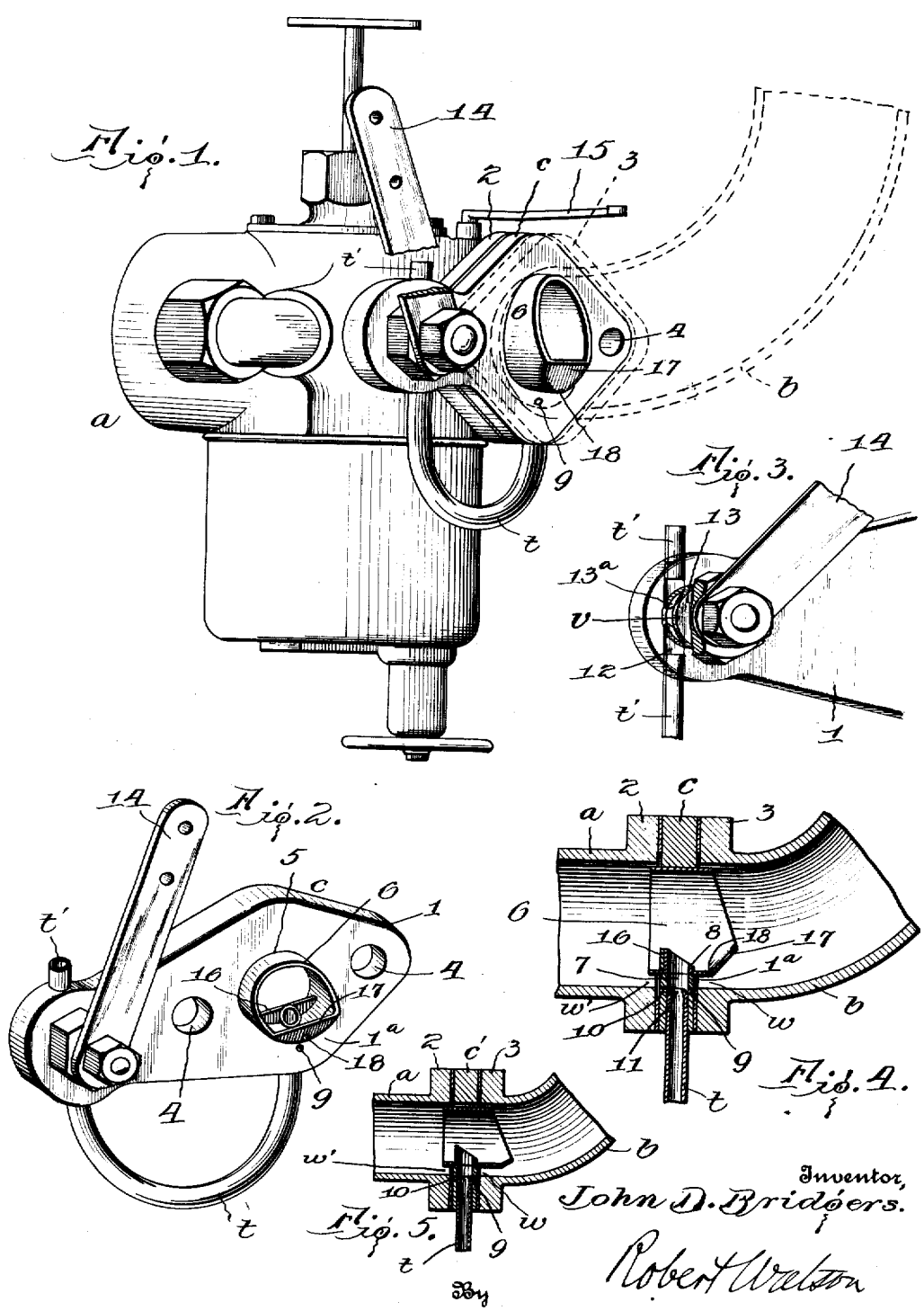

Patented July 31, 1923.

1,463,496

UNITED STATES PATENT OFFICE.

JOHN D. BRIDGERS, OF FLORENCE, SOUTH CAROLINA.

REATOMIZER ATTACHMENT FOR INTERNAL-COMBUSTION ENGINES.

Application filed February 13, 1922. Serial No. 536,212.

*To all whom it may concern:*

Be it known that I, JOHN D. BRIDGERS, a citizen of the United States, residing at Florence, in the county of Florence and State of South Carolina, have invented certain new and useful Improvements in Re-atomizer Attachments for Internal-Combustion Engines, of which the following is a specification.

This invention relates to a device adapted to be arranged in the passageway through the carbureter and intake manifold of an internal combustion engine, for re-atomizing any liquid condensing or collecting in the passageway from the carbureter to the engine, for delivering auxiliary air into the manifold when the engine is running, for automatically priming the engine when it is started after having been run for a time, and for permitting the engine to be readily primed by hand when necessary.

The invention, in the form herein shown, comprises a fitting adapted to be connected between the intake manifold and the carbureter and forming, with the walls of said members, wells or pockets for receiving any liquid fuel which collects in the manifold, or at the outlet end of the carbureter. From these wells, an auxiliary air conduit or duct leads downwardly and thence upwardly and has one end open to the atmosphere, and a valve is provided for controlling the admission of air to this conduit. The form of the conduit makes it suitable for holding a charge of liquid fuel, which may be inserted through this open end, for initially priming the engine, or which may collect in the wells and pass into the conduit when the engine is stopped. Fuel inserted or collected in the conduit is sprayed into the main passageway when the engine is started, thus enriching the mixture temporarily, and while the engine is running auxiliary air is admitted for re-atomizing any fuel collecting in the wells and for improving the mixture passing from the carbureter. The auxiliary air valve is preferably connected to the throttle valve so as to open and close with the latter.

In the accompanying drawing,

Fig. 1 is a perspective view of the carbureter and the intake manifold of an internal combustion engine with the re-atomizing device of my invention secured between them, the manifold being shown in dotted lines;

Fig. 2 is a similar view of the re-atomizing device detached;

Fig. 3 is a similar view of the outer end of the re-atomizing device, showing the controlling valve and air passageway in skeletonized outline;

Fig. 4 is a central vertical longitudinal section through the re-atomizing device and the adjacent portions of the carbureter and intake manifold; and, Fig. 5 is a view similar to that in Fig. 4, on a smaller scale, showing a modification of the re-atomizing device.

Referring to Figs. 1 to 4, inclusive of the drawing, $a$ represents a carbureter, $b$ the intake manifold of an internal combustion engine, and $c$ represents the re-atomizing device of my invention. The body 1 of the re-atomizing device is a flat metal plate, adapted to be clamped between the opposing flanges 2 and 3 of the carbureter and manifold, respectively, and provided with bolt holes 4 for receiving the clamping bolts which connect the carbureter and manifold. The plate has a large central opening 5, for permitting the atomized liquid fuel and air to flow from the carbureter through the manifold to the engine, and in this opening is fitted a section of thin tubing 6, which preferably projects beyond both faces of the plate, as shown. The opening in the plate is smaller in diameter than the outlet end of the carbureter or the intake end of the manifold so that a part of the plate 1ª forms a barrier in the main passageway for catching any liquid fuel which may condense or deposit on the wall of the manifold, or which may be sprayed against it in the form of unatomized drops from the carbureter. The plate and the part of the tubing which projects into the manifold form, with the wall of the latter, a well or pocket $w$ in which the drip from the manifold collects in a "puddle." Similarly, the part 1ª of the plate and the part of the tubing 6 which projects into the outlet of the carbureter form, with the wall of the carbureter, a well or pocket $w'$ in which unatomized fuel sprayed from the carbureter collects. The plate has a bore 7 extending from its lower edge upward to the opening 5, and in the lower wall of the tubing 6 is fitted a short piece of tubing 8 which registers with the bore 7 and projects into the main passageway, forming a continuation of said bore. A small perforation 9 extends through the part 1ª of the plate from the well $w$ into the bore 7, and a similar perforation 10 extends from the well $w'$ into said bore. In the bore 7 is fitted one end of a U-shaped tube $t$, said end extending to a point about in line with or slightly above the perforations 9 and 10 and being preferably contracted at its outlet to form a nozzle, as shown at 11. This tube extends downwardly and then upwardly, so as to retain any liquid draining into it from the wells and is fitted into a bore 12 in a part of the plate 1 which extends at one side of the flanges of the carbureter and intake manifold. A short section of tubing $t'$ is fitted into the upper end of said bore and projects above the plate. Between the tubes $t$ and $t'$ is arranged a valve $v$, consisting of a disk 13, having a notch 13ª cut in its peripheral wall, which notch registers with the bore 12 in one extreme position of the valve and closes said bore in the other extreme position of the valve. This valve is operated by a lever 14, which is adapted to be connected to the throttle valve lever 15, by suitable means, so that the two valves will move simultaneously toward their closed and opened positions.

The upwardly projecting tube $t'$ constitutes a priming cup by which liquid fuel may be fed into the tube $t$ for a priming charge. It will be evident then that when the engine is cranked and a partial vacuum is created in the intake manifold, the valve $v$ being partly open, auxiliary air will flow through the tube $t$ and force the liquid fuel in a spray through the nozzle end of said tube into the main passageway between the carbureter and manifold. While the motor is in operation, any fuel drops condensing or collecting on the wall of the manifold will gravitate into the well $w$ and will be sucked through the orifice 9 by the aspirating effect of the air issuing from the nozzle of the auxiliary air conduit $t'$, and will be atomized and sprayed into the main air passageway and flow thence to the engine. Any fuel collecting in the well $w'$ will be likewise sucked through the orifice 10 and atomized and sprayed into the main passageway. When the engine stops, a considerable amount of fuel will drain from the intake pipe into the well $w$ and will then flow by gravity through the orifice 9 into the conduit $t$, where it will remain until the engine is again started. When the engine is started this fuel will be sprayed by the auxiliary air into the main air passageway and will enrich the mixture temporarily, which is desirable for starting. Thus, the device is self priming. When the choke valve in a carbureter is closed, in starting, to cause a heavy spray of fuel from the fuel nozzle, this spray is poorly atomized and a considerable quantity of it drops back and collects in a pool in the carbureter. When the re-atomizer of my invention is used, this unatomized fuel issuing from the fuel nozzle and striking against the wall of the carbureter outlet and the body of the re-atomizing device, collects in the well $w'$ and is drawn through the opening 10 and atomized by the air stream issuing from the tube $t$.

While the ordinary auxiliary air devices must be closed for starting, to prevent the mixture from becoming too lean, this device may be opened along with the throttle and it causes an initial enrichment of the mixture. After the motor has started and is running normally, the auxiliary air assists in atomizing the fuel in the main passageway, causing the mixture to become leaner and improves the combustion, thus increasing the efficiency of the engine.

In order to increase the suction at the outlet of the auxiliary air duct, I preferably place a barrier 16 across the main air passageway at the rear of the outlet 8, and incline the lower forward end of the tube 6 upwardly, to form a barrier 17 in advance of the outlet tube 8, so that the latter is in a sort of pocket formed by said barriers. The mixture from the carbureter flowing over said barriers will lower the pressure in the pocket and increase the suction at the outlet of the auxiliary air conduit. I preferably bevel the end of the outlet tube 8 downwardly and forwardly, as shown, in order to permit the air and spray issuing therefrom to more readily take the direction of the current of mixture flowing to the intake pipe. As liquid fuel may collect in this pocket, I provide a perforation 18 at the base of the barrier 17, to permit this fuel to drain into the well $w$. The barriers 16 and 17 are desirable but not essential, and in Fig. 5 these features are omitted.

It is believed the operation will be clear from the foregoing without further description. In the drawing, the carbureter is arranged with a horizontal outlet, but the device is adaptable, with slight changes, for an arrangement wherein the carbureter outlet is vertical. Also, while the re-atomizing device is shown as a fitting clamped between the carbureter and intake manifold, it may be made as a component part of either, by casting the plate 1 integral with the carbureter or with the manifold.

What I claim is:

1. The combination with the carbureter and intake manifold of an internal combustion engine, of a re-atomizing device therebetween, said device forming, with the maifold, a well for the collection of liquid fuel and having an auxiliary air duct leading downwardly from a point outside the passageway through said members and thence upwardly into said passageway and communicating with said well.

2. The combination with the carbureter and intake manifold of an internal combustion engine, of a re-atomizing device forming, with the manifold, a well for the collection of liquid fuel and having an auxiliary air duct leading downwardly from a point outside the passageway through said members and thence upwardly into said passageway and communicating with said well, and a valve for controlling the flow of air through said duct.

3. The combination with the carbureter and intake manifold of an internal combustion engine, of a re-atomizing device forming a well for the collection of liquid fuel in the passageway through said members and having an auxiliary air duct leading downwardly from a point outside the passageway and thence upwardly into said passageway, said duct having a contracted portion forming a nozzle adjacent its outlet, and said device having an orifice connecting said well and duct adjacent said nozzle.

4. A device for the purposes set forth comprising a plate adapted to be clamped between the carbureter and intake manifold of an internal combustion engine and having an opening adapted to form a part of the passageway through said members, said plate forming, with the carbureter and manifold, wells for the collection of liquid fuel, an auxiliary air tube connected to a part of the plate outside the manifold and extending downwardly and then upwardly to said passageway and communicating with said wells, and a valve for controlling the flow of air through said tube.

5. A device for the purposes set forth comprising a plate adapted to be clamped between the carbureter and intake manifold of an internal combustion engine and having an opening adapted to form a part of the passageway through said members, a tubular member fitting in said opening and projecting beyond the face of the plate and an auxiliary air duct extending through the wall of the tubular member, barriers in said latter member at the front and rear of said duct, said tubular member having a drain opening, and said plate having an orifice below said latter member extending from the face of the plate to said duct.

In testimony whereof I affix my signanature.

JOHN D. BRIDGERS.